United States Patent Office 3,425,327
Patented Feb. 4, 1969

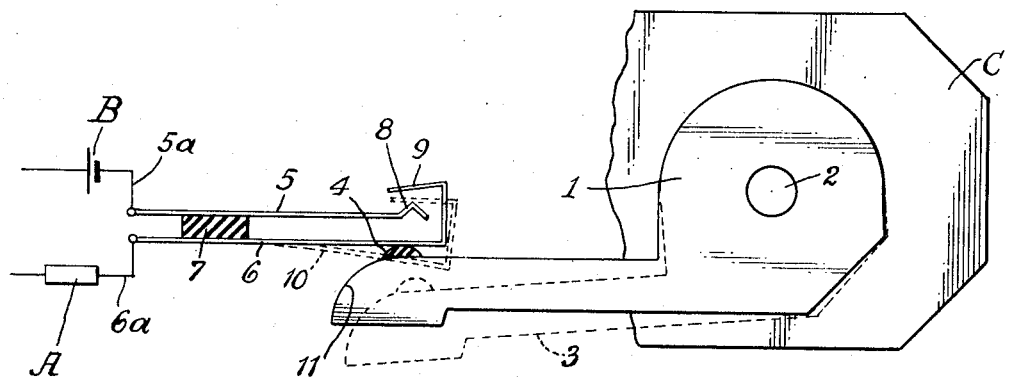
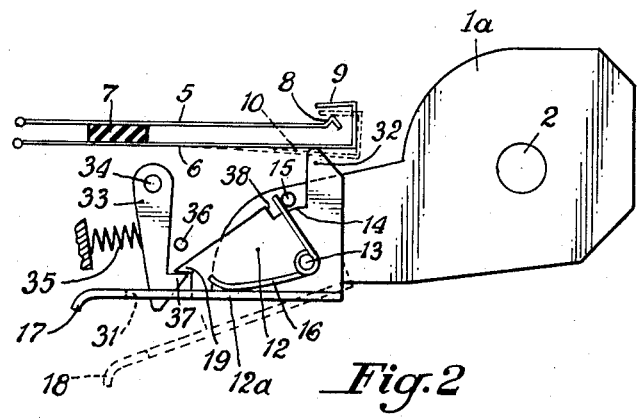
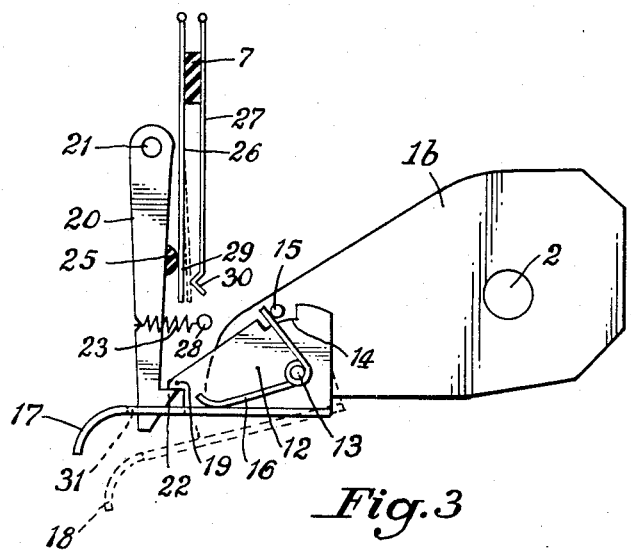

3,425,327
PHOTOGRAPHIC CAMERA WITH EXPOSURE ADJUSTING DEVICE
Josef Stüper, Maichingen, Wurttemberg, and Markus Wieland, Stuttgart-Bad Cannstatt, Germany, assignors to Zeiss Ikon Aktiengesellschaft, Stuttgart-S, Germany, a corporation of Germany
Filed Jan. 28, 1966, Ser. No. 523,703
Claims priority, application Germany, Feb. 6, 1965, Z 9,669
U.S. Cl. 95—10       5 Claims
Int. Cl. G01j 1/52

ABSTRACT OF THE DISCLOSURE

A photographic camera is provided with an exposure meter circuit and a switch for closing and opening this circuit is arranged adjacent the free end of a manually operable shutter tensioning and film advancing lever. The switch is closed by said lever in its initial position but may be opened when the lever is pivoted a short distance in a direction which is opposite to the direction in which the lever tensions the shutter and advances the film.

---

This invention relates to a photographic camera equipped with exposure adjusting means which includes a photo-resistance cell that requires an electric battery as a source of energy.

In order to preserve the life of the battery in such cameras, current must be drawn sparingly and means have already been proposed for interrupting the battery circuit temporarily. However, such known means are not very efficient, since in most cases they allow a closed circuit of the exposure adjusting device even at times when the camera is not actually in use, thus creating a steady drain on the battery.

An object of the present invention is to construct the rapid tensioning lever of the camera and/or combine it with contacts in the circuit of the exposure adjusting device in such a manner that by an additional movement of this lever after the latter has returned to its initial position, this circuit can be opened or closed. As provided by this invention, such additional movement of the lever is preferably an additional movement in the same direction as required for the customary movement of the rapid tensioning lever. Such movement, for instance, can be in moving the lever closer toward the rear wall of the camera housing, whereby opening of the contacts and interruption of the exposure adjusting circuit can be effected.

The requirement of such an additional movement may incur a greater distance of movement than can be overcome by a common rapid tensioning lever within the range of its other functions. Therefore, this invention provides furthermore an additional lever element that is linked to the rapid tensioning lever and takes control of the circuit making and interrupting contacts either directly or indirectly.

In another modification of the invention, such an additional lever element cooperates with a locking member which in its effective position arrests the rapid tensioning lever and keeps the contacts open; and which, when manually acted on for release, releases the rapid tensioning lever, whereby closing of the contacts is effected.

The invention furthermore provides that the lever element itself, for that purpose equipped with a switching cam, effects opening and closing of the contacts. However, the arrangement can also be such that the contact opening and closing function is assigned to the locking member.

For a better understanding of all features and advantages of the invention, a detailed description of preferred embodiments will now be given with reference to the accompanying drawing, wherein—

FIG. 1 is a diagrammatic plan view of an embodiment in which the rapid tensioning lever itself performs the contact opening and closing functions;

FIG. 2 is a diagrammatic plan view of a modification in which contact control is assigned to a lever element pivotally mounted on the rapid tensioning lever and cooperating with a locking member; and FIG. 3 is a diagrammatic plan view of another modification in which the locking member takes over the control of the circuit opening and closing contacts.

In all of the figures, the positions of the mechanism elements when the contacts are open, are indicated by full lines, and the respective positions when the contacts are closed, are indicated by broken lines.

Referring to FIG. 1, the rapid tensioning lever 1 which in most cameras tensions the shutter mechanism and advances the film a distance of one frame is mounted for swinging motion about the fixed pivot axis 2, is provided with a handle portion 11, and carries a switching cam 4 for controlling the opening and closing of a pair of contacts 8, 9 which are secured to leaf springs 5, 6 insulated from each other by an insulating block 7. The contact unit, of course, is interposed in an exposure adjusting circuit of which only two conductors 5a and 6a, a battery B and a photo-resistance A are diagrammatically indicated.

The rapid tensioning lever 1 can assume two different tensioned positions with respect to the wall of the camera housing C. One position, indicated at 3 by a broken outline, is the usual position taken by the lever after completion of the film transport for another exposure and tensioning of the shutter. In this position, it will be noted, the contacts 8, 9 are closed, since the leaf spring 6 remains in the position shown by the broken line 10. With the contacts closed, the exposure adjusting device is in operation and its battery under load. The other position of the rapid tensioning lever 1, as shown by the full line, is the position reached after additional travel of the lever 1 in clockwise direction. This can be obtained, for instance, by urging the lever in clockwise direction with the result that switching cam 4 pushes against leaf spring 6 moving it into the full-line position and opening the contacts 8, 9. Thus for preserving the life of the battery when the camera is not in use, it is only necessary to rotate the rapid tensioning lever 1 closer toward the rear wall of the camera and thereby disconnect the battery B from the circuit of the exposure regulating means.

In readying the camera for service and for rendering the exposure adjuster effective again, it is only necessary to pull the handle portion 11 of the rapid tensioning lever 1 in counter-clockwise direction away from the rear wall of the camera into the broken-line position 3. Here the contacts 8, 9 are closed and current of the battery B can pass to the photo-resistance cell of the exposure adjusting device.

In the embodiment of the invention as shown in FIG. 2, which is particularly adapted to provide a longer additional path of travel, an additional lever element 12 is pivotally mounted on a pin 13 carried by the rapid tensioning lever 1a. This lever element 12 is urged to swing outwardly or in counter-clockwise direction by a spring 16. One end of spring 16 rests against a pin 15 secured to the rapid tensioning lever 1a and the other end of the spring is urged against an upturned flange 12a on the horizontal portion of lever element 12. This flange 12a extends outwardly and its outer end forms a handle portion 17. The pin 15, secured to the rapid tensioning lever 1a, engages a notch 14 in lever element 12 and thus serves also as a stop which limits the swinging movement of this lever element 12 in both directions, i.e., when the lateral edges of the notch strike against the pin 15.

The upturned flange 12a of lever element 12 adjacent to the handle portion 17 is provided with a recess 31. The other upwardly directed portion of lever element 12 terminates in a switching cam 32 which engages the leaf spring 6. Into the recess 31 extends the lower end of a locking member 33 which is pivotally mounted with its upper end on a pin 34 secured to the camera housing and is urged toward the right and against a stop pin 36 by a compression spring 35.

The lower free end of the locking member 33 terminates in a catch 37 suitable for engaging a projection 19 on the lever element 12. Furthermore, the locking member 33 with its catch 37 extends through the recess 31 in the flange 12a of lever element 12 a sufficient distance so that the locking member 33 can be engaged by a finger of the camera user and be moved laterally away from the projection 19.

A previously stated with reference to all of the figures, it is here to be remembered that also in FIG. 2 the two possible end positions of lever element 12 and leaf spring 6 are distinguished from each other in that the positions taken after additional movement and opening of the contacts 8, 9 are shown in full line, while the closed contact position is shown in broken lines. It will be noted that in the open contact position, the projection 19 of the lever element 12 and the catch 37 on locking member 33 are engaged with one another, and it will be understood that after disengagement of these parts, the lever element 12 will be urged by the spring 16 into a position in which the handle portion assumes the position indicated at 18 in broken lines. Since the switching cam 32 moves correspondingly, it will be clear that the leaf spring 6, by action of its resiliency, will return to its broken-line position 10 and thereby close the contacts 8, 9.

The mode of action is now as follows:

After completion of the film transport by the rapid tensioning lever 1a and before the intended use of the camera, the lever element 12 is left in the position shown by the broken lines 18 indicating the handle portion. In this position, the projection 19 and catch 37 are disengaged and the contacts 8, 9 are closed. The exposure adjusting circuit is now operative. However, in case it is not intended to use the camera immediately, then in order to preserve the life of the battery, it is only necessary to actuate the handle portion 17 an additional movement to bring it into the position shown in full line. Such movement causes the projection 19 of lever element 12 to engage the catch 37 on the locking member 33, thereby retaining the lever element 12 in a position in which its switching cam 32 pushes the leaf spring 6 upwardly and the contact 9 moves away from contact 8, thereby interrupting the battery circuit. In order to render the exposure adjusting device operative again, only the pressure of a finger of the camera user against the lower extension of the locking member 33 and against the action of the spring 35 is necessary to disengage the catch 37 from the projection 19 with the result that the lever element 12 swings backwardly owing to the action of the spring 16 and thereby the cam 32 releases the leaf spring 6 for closing of the contacts 8, 9.

It is important to understand that the rapid tensioning lever can be used for its original functions of film transport and shutter tensioning without interfering with the additional circuit opening and closing function of its lever element 12. A practically rigid connection between the rapid tensioning lever 1a and the lever element 12 is established by means of the engagement between pin 15 with the end walls of the notch 14, particularly the end wall 38.

The embodiment of the invention shown in FIG. 3 differs from that in FIG. 2 only in that the leaf springs 26 and 27 with their contacts 29 and 30 are not actuated by a cam forming a part of lever element 12, but are actuated by a cam 25 provided on a locking member 20 pivoted with one end to a pivot pin 21. The locking member 20 is under the influence of a tension spring 23, secured with one of its ends to the camera housing at 28, is provided at its free end with a catch 22 which, similar to the catch 37 of FIG. 2, is adapted to engage the projection 19 of the lever element 12. The free end of the locking member 20 extends furthermore far enough through recess 31 in the handle portion 17 of the lever element 12 so that it can be actuated by a human finger. All other parts of this embodiment are in their construction and function similar to corresponding parts in the embodiment as shown in FIG. 2, and a further explanation toward that end appears to be unnecessary.

The mode of action of the embodiment of FIG. 3, having a differently fashioned locking member 20, is as follows:

After the rapid tensioning lever 1b has been actuated to perform the functions of film transport and shutter tensioning and has returned to its initial position, and assuming the camera is to be used for making an exposure within a short time, the handle portion 17 is left in the position 18 indicated by the broken lines. In this position, the lever element 12 and the locking member 20 are not engaged at 19, 22 and the locking member 20 is free to swing forwardly under the tension of the spring 23 with the result of pushing the leaf spring 26 in the direction of closing the contacts 29, 30, thus completing the battery circuit of the exposure adjusting device and rendering it effective. On the other hand, if the camera is not to be used for making an exposure within a reasonable time and consideration for battery preservation is given, it is only necessary to move the handle portion 17 a short distance in clockwise direction so as to bring it into the full-line position. This action causes an engagement of the catch 22 with the projection 19 of the lever element 12. During this engagement, the locking member 20 moves in clockwise direction away from the leaf spring 26, causing the contacts 29, 30 to open. If, however, the exposure adjusting device is to be returned to working order, it requires only the pressure of a finger of the camera user against the lower extension of locking member 20 to release the engagement between 19 and 22 with the result that lever element 12 returns, owing to the action of the spring 16, to the position indicated by the handle portion shown in broken lines 18. With the locking member 20 now free to swing under the action of the spring 23, it will push with its cam 25 against the leaf spring 26 and thereby close the contacts 29, 30.

What we claim is:

1. In a photographic camera, the combination comprising a manually operable pivotally mounted shutter tensioning and film advancing lever, and an exposure meter circuit including a switch, means for pivotally mounting one end of said lever while the other free end of said lever forming a handle portion for manually pivoting said lever from an initial position in a direction in which the shutter is tensioned and the film is advanced, said lever then returning to said initial position, said switch being arranged adjacent the free end of said lever and in said initial position of said lever being closed, said lever being adapted to be pivoted from said initial position in a direction opposite to the one in which a shutter tensioning and film advance takes place for the purpose of opening said switch.

2. A photographic camera according to claim 1, including an angular lever pivotally mounted on said manually operable shutter tensioning and film advancing lever, one arm of said angular lever being adapted to open and close said switch in said circuit, and a manually releasable locking member pivotally mounted on said camera for holding said angular lever in a position in which the latter holds said switch in an open position when said shutter tensioning and film advancing lever is in said initial position.

3. A photographic camera according to claim 2, in which said manually releasable locking member when released from said angular lever causing the latter, under the action of a spring, to move into a position in which said switch is caused to close.

4. A photographic camera according to claim 1, including an angular lever pivotally mounted for limited rotational movement on said manually operable shutter tensioning and film advancing lever, a manually releasable pivotally mounted locking lever adapted to engage said angular lever to be held thereby in a position in which said locking lever holds said switch in an open position, said locking lever upon manual release from said angular lever causing said switch to close under the action of a spring.

5. A photographic camera according to claim 4, in which said locking lever is provided with a cam-like projection which after a manual release of said locking lever from said angular lever is moved by a spring acting on said locking lever into engagement with said switch to close it.

References Cited

UNITED STATES PATENTS 3,367,251  2/1968  Furuta _____ 95—31 X

NORTON ANSHER, *Primary Examiner.*

J. F. PETERS, JR., *Assistant Examiner.*

U.S. Cl. X.R.

200—61.58